June 10, 1952      T. MILLER      2,600,016
HYDRAULIC DRAWBAR CONTROL
Filed July 27, 1950
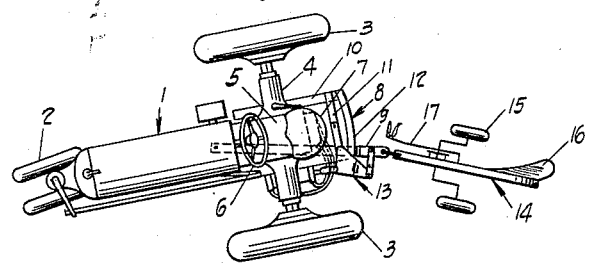
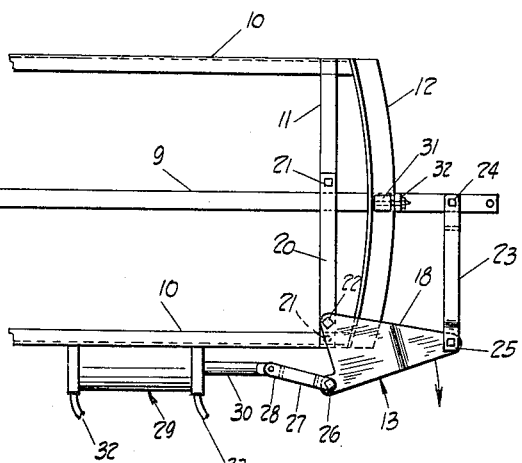
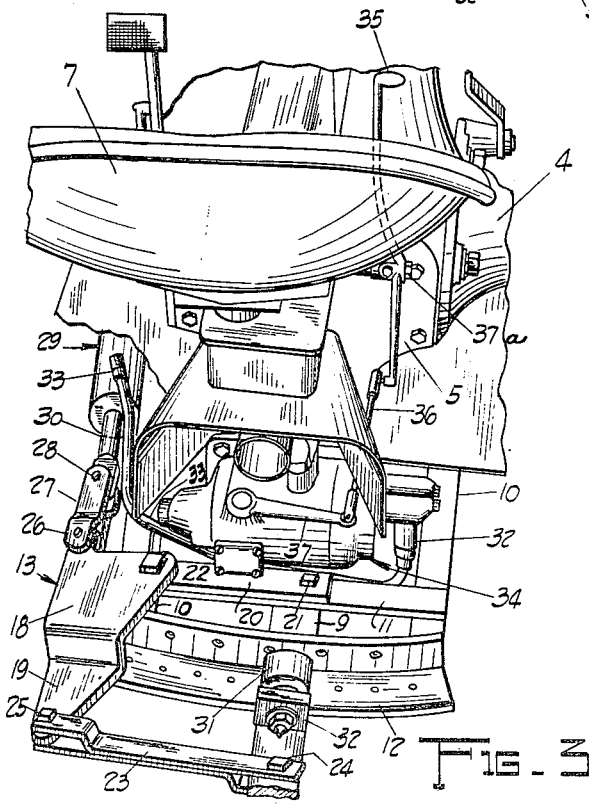
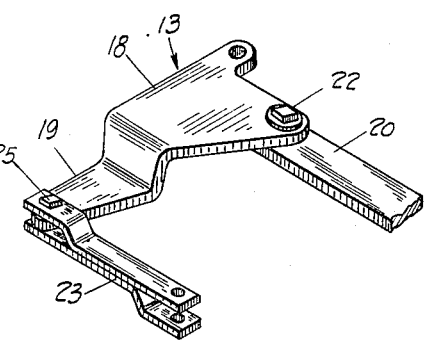
INVENTOR.
Titus Miller
BY Robb & Robb,
Attorneys Patented June 10, 1952

2,600,016

UNITED STATES PATENT OFFICE 2,600,016

HYDRAULIC DRAWBAR CONTROL

Titus Miller, Baltic, Ohio, assignor of forty per cent to Davis J. Parker, Parma, Ohio Application July 27, 1950, Serial No. 176,213

1 Claim. (Cl. 280—33.12)

The present invention pertains to improvements in combination tractor and implement or vehicle machines in which the tractor is ordinarily equipped with a transversely swingable drawbar adapted to be hitched to an implement or vehicle for pulling the latter.

This invention essentially comprises certain novel controlling and operating means for shifting and holding the drawbar in a predetermined position during the driving of the tractor when hitched to the implement which is being pulled thereby.

A particular advantage of the invention lies in the fact that the customary fluid operated power cylinder unit with which agricultural tractors now come equipped, may be utilized as the power source for the controlling or operating action of the drawbar that is obtained by the use of the instrumentalities comprising the invention.

The present invention is especially advantageous in conjunction with contour plowing operations and where the tractor is employed for pulling not only plows but corn pickers, combines, and the like. Furthermore, the invention is especially useful in enabling shifting and fixing of the position of the drawbar when such operations are desired in backing a tractor which may be hitched by the drawbar with a wheeled vehicle or the like.

An essential feature of the invention lies in the provision of instrumentalities connected with the drawbar and which are controllable from the drivers station or seat on the tractor, for moving and fixing the position of the drawbar at various adjustments, without necessitating that the driver of the tractor get off the machine or move from his position on the driver's seat.

By way of exemplification of the advantages of the present invention, it is notable that when a tractor of the type referred to is hitched by its customary drawbar to a plow, if contour plowing is being performed, it is the common practice to prevent the movement of the drawbar transversely of the line of movement of the tractor by dropping lock pins vertically through openings in the segment supporting member upon which the drawbar rides. These locking pins at opposite sides of the drawbar, and carried by said supporting member, will prevent the shifting of the drawbar during the forward movement of the tractor. Under these conditions of operation, however, it is possible for the plow which is hitched to the drawbar to shift laterally from the line of the furrow, and when such shifting starts it becomes necessary to stop the tractor and then the driver has to get off the tractor and reset the drawbar at an adjustment in the direction uphill in relation to the ground being plowed. Thereupon, the tractor has to be backed and the plow reset to a proper position in the original furrow and then the forward movement of the tractor is started again with the drawbar in the reset position so as to continue the furrow in a proper direct line, as when originally commenced. The foregoing requirements of operating tractors with plows, especially in contour plowing, make for loss of time and give considerable trouble in plowing straight furrows, as will be readily perceived.

Now in respect to operations such as have just been described, respecting contour plowing, the provisions of the present invention are such that the piston and piston rod of the power cylinder, operation of which is controlled in the usual manner from the seat of the driver on the tractor, are connected by connecting linkage and operating devices directly with the drawbar. These provisions enable the operator, therefore, to shift the drawbar in a transverse swinging direction relatively to the line of movement of the tractor so as to bring said drawbar into any desired position within the range or limits of such transverse movement, at the will of the operator, and when shifted to a desired position the drawbar is positively held at such position.

It is obvious from the foregoing that by reason of the employment of the instrumentalities of the present invention, if the driver of the tractor pulling the implement such as a plow, observes that during the forward movement of the tractor the plow starts to shift laterally from the line of the furrow, such driver can immediately by operating the control lever at his driver's seat, use the power cylinder operating unit and connections to the drawbar to shift the drawbar while the tractor and implement progress forwardly, so that the point of connection between the drawbar and the implement is correspondingly shifted to restore the plow movement to the proper line of the furrow or maintain said plow at such line of the furrow without necessitating any stopping of the tractor or that the driver get off the machine and perform any manual operation of readjustment of the drawbar and its connection to the plow or like implement.

The instrumentalities of the invention are advantageously usable along the lines of the above operation where the tractor is pulling a corn picker which must be maintained to move in a narrow line of forward movement in order to effectively perform the picking operation for which it is designed. The control mechanism in a similar way is equally advantageous for controlling positive and accurate forward movement of combines.

Where the tractor is hitched to a vehicle, my control means, by which the drawbar may be maintained in a certain definite position and shifted to other predetermined positions that may be required or desired, may be utilized to facilitate the proper steering of a pulled vehicle or the like with which the tractor is hitched, when the tractor is being backed to correspondingly back the vehicle.

Another phase of this invention, ancillary to the features above outlined, lies in providing a connecting linkage and lever plate unit adapted to be mounted on a tractor or tractors of a construction at present in use to act as an adaptor unit for converting such tractor from one involving the direct manually movable and resettable drawbar arrangement, into the special type of fluid unit operated type of the invention. Thus, changing of any parts of the tractor, and the drawbar feature thereof, are not required, and an adaptor unit relatively cheap in cost and easily to be applied to the tractor is obtained, making the changing of the tractors of certain present types to utilize this invention, a simple operation.

A full understanding of the details of construction of the instrumentalities of the invention herein presented will be had upon reference to the following detail description in conjunction with the accompanying drawings, and in the latter:

Figure 1 is a top plan view showing a conventional form of tractor having mounted thereon the lever plate unit of the invention and generally illustrating a single bottom plow attached to the draft or draw bar of the tractor. The tractor and implement is shown in a position which might be assumed during certain contour plowing operations, the same being somewhat exaggerated for the purpose of illustration.

Figure 2 is a top plan view somewhat fragmentary in nature illustrating the lever plate unit and its mounting upon the draft apparatus of the tractor including the connection of the same with an hydraulic control unit and the draft or draw bar.

Figure 3 is a rear view in perspective, with certain portions of the tractor broken away to illustrate somewhat more in detail the construction and arrangement of the lever plate unit, the controls therefor, and the operator's station on the tractor.

Figure 4 is a view showing the lever plate unit in perspective and the formation of certain of the various parts thereof.

Referring to Figure 1, wherein is illustrated a tractor generally designated 1 including steering wheels 2 and rear traction wheels 3, the tractor is of conventional design and includes a motor connected in the usual manner to the rear axle unit, the same being comprised of the usual axle and housings 4. The axle housings 4 are connected at their inner ends to a transmission and differential housing 5, the transmission and differential housing in turn being suitably fastened to the motor so as to form a rigid unit therewith. The usual steering gear 6 is provided for controlling the direction of operation of the tractor, and the operator's seat 7 is suitably supported above the rear axle according to conventional construction. Beneath the rear axle and transmission housing 5 a draft mechanism generally designated 8 is supported upon the same in any suitable manner and includes a draw bar or draft bar 9 pivotally connected below the tractor and in front of the said housing at 9A. The draft mechanism 8 previously referred to, additionally includes a pair of longitudinal frame members 10 fixed to the housing as previously indicated and at the rear thereof connected together by a cross bar or member 11. An arcuate shaped member 12 is likewise fastened at its ends to the longitudinal frame members 10. Adjacent one end of the tranverse cross bar or member 11, a lever plate unit 13 is shown as being suitably fastened thereto. At the rear of the draft or draw bar 9 a single bottom plow denoted 14, of conventional construction, is shown connected thereto, and includes supporting wheels 15, and a plow share 16, supported in the usual manner on a plow beam, the plow share being adjustable for penetration of the earth by the use of the usual lever 17. The lever plate unit 13, previously referred to, comprises a substantially triangular shaped body member 18 as shown in Figures 2 and 4, the said body portion 18 including an offset portion 19. The body member 18 is pivotally connected to an attaching bar member 20, the said member 20 being fixed to the member 11 by means of suitable bolts indicated at 21. The pivotal connection of the body portion 18 with the bar 20 at 22 enables the movement of the body member 18 in a manner to be hereinafter set forth. Adjacent the rear of the body member 18 a link 23 is shown as being connected to the draft bar 9, previously referred to, by means of a pivotal connection at 24 and to the body member at 25. The body member 18 at another corner of the same is pivotally connected at 26 to a link 27, the link 27 in turn being pivotally connected at 28 to a piston and cylinder unit 29 at one end of a piston rod 30 of said unit. The piston and cylinder unit 29 is suitably supported at one side of the transmission and differential housing 5 of the tractor 1 for operation in a manner to be hereinafter set forth.

The draft bar 9 is supported at its outer end for movement about the pivotal connection 9A beneath the tractor as previously described, on a roller 31 suitably fastened to said draft or draw bar 9 by means of an angle member 32 as shown in Figure 3. It will be apparent from the foregoing that movement of the draw bar about the pivot 9A will cause the roller 31 to roll across the arcuate shaped member 12 previously referred to.

The piston and cylinder unit 29 previously mentioned is adapted to be operated by an hydraulic medium delivered thereto by means of hoses 32 and 33 under the control of an hydraulic control unit generally indicated at 34 in Figure 3. The hydraulic control unit 34, mounted transversely at the rear end of the tractor, is of generally known construction and is therefore not further illustrated. The said control unit 34 includes therein a gear type pump, the same being driven from the power take-off shaft of the tractor whereby the fluid under pressure may be introduced at opposite ends of the hydraulic piston and cylinder unit 29 previously referred to under the control of a valve included in the said unit 34. A control lever 35 is suitably supported near the operator's station 7, previously referred to. By means of a link 36 connected to a lever 37 which is in turn secured to the shaft of the control valve, the same may be operated to effect introduction of the fluid under pressure at opposite ends of the piston and cylinder unit 29. The control lever 35 is pivotally supported adajcent the operator's seat 7 on the housing 5 for movement about the pivot 37a whereby the said lever may be manipulated forwardly and rearwardly to actuate the control valve of the unit 35.

In view of the foregoing it will be seen that suitable operation of the control lever 35 in one direction, as for example toward the front of the tractor, will cause a movement of the lever 37 rearwardly, whereby fluid under pressure will be introduced through pipe 33 to the hydraulic piston and cylinder unit 29 causing the rod 30 thereof to move toward the front of the tractor, as seen in Figure 2, in turn transferring a rotary motion in the direction of the arrow of Figure 2, to the lever plate unit body member 18, previously mentioned. This is effected of course through means of link 27, and since the body member 18 of the unit 13 is pivoted at 22, the said motion will in turn be transferred to the draft or draw bar 9 by means of link 23 connected at 25 and 24 respectively to the body member 18 and draft bar 9, and thus pivotal movement of the draft bar 9 about the pivot 9A will be effected. It will be clear that introduction of fluid under pressure to the opposite end of the hydraulic piston and cylinder unit 29 under the control of the control valve of the hydraulic unit 34, as regulated by the control lever 35, will cause the piston rod 30 of the piston and cylinder unit 29 to move in the opposite direction and thus the body member 18 of the lever plate unit 13 to pivot in the opposite direction to that previously mentioned whereby the draft or draw bar 9 will be caused to move in an opposite direction to the arrow in Figure 2.

In the operation of a tractor equipped with the instrumentalities herein above described, the same including a pivoted draft or draw bar, a lever plate unit including linkage pivoted thereto, a hydraulic piston and cylinder unit and an hydraulic unit including a control valve for controlling the same, the operator of the tractor may effect a pivotal movement of the draft bar and thus change the direction of an implement being towed by the tractor, at will and without leaving his position on the seat of the tractor. As has been previously described, the tractor shown in Figure 1 has connected to its draft or draw bar, a single bottom plow and during contour plowing operation when it becomes necessary, upon occasion, to change the direction of travel of the plow by reason of a tendency of the same to slip downhill relatively to the direction of travel of the tractor, the plow may be again correctly aligned so as to keep the furrow parallel with previously plowed furrows. Heretofore when a tractor was not equipped with the adjustable draft mechanism herein described, the operator was compelled to leave his position on the seat of the tractor and manually adjust the drawbar. This operation includes several steps; such as, initially backing the tractor, slightly to reduce the draft tension, removal of pins at each side of the draft or drawbar, movement of the drawbar and the plow beam connection therewith along the arcuate member 12 by sheer physical force, and finally replacement of the pins in holes provided therefor in the arcuate member 12 at opposite sides of the drawbar. The operator could then resume his seat and proceed. However subsequent adjustment would in all probability be required, necessitating again following the steps outlined just above. When a tractor is equipped with the invention herein described the operator need not leave his station, but by moving the control lever 35 cause the draft or drawbar 9 to be moved to the proper position simultaneously and gradually if necessary and thereby change the direction of travel of the plow through operation of the hydraulic unit 34 under the control of the control valve therein, to actuate the piston 30 of the hydraulic piston and cylinder unit 29 and thus the lever plate unit 13, whereby the said draft bar 9 may be properly adjusted to change the direction of travel of the implement being towed by the tractor. The condition of travel shown in Fig. 1 is of course somewhat exaggerated for the purposes of explaining the operation of the mechanism of the invention but may under certain circumstances actually be encountered in practice.

In view of the foregoing description of the mechanism of my invention and the operation thereof it will be clear that a simple mechanism for adjusting the towed direction of travel of an implement connected to a tractor, is provided, and in use the mechanism is found to be very effective to overcome difficulties heretofore encountered by reason of the necessity for manual manipulation of the draft or drawbar when the tractor is towing a farm implement.

It will be clear that suitable operation of the control lever 35 adjacent the operator's station or seat by reason of the provision of hydraulic unit 34 may result in moving and holding the draft or drawbar 9 into an infinite number of positions in its lateral or transverse movement about the pivot 9A across the arcuate member 12.

I claim:

In combination, a tractor having a rearwardly extending pivotal drawbar and drawbar supporting means, comprising a transverse cross bar connecting longitudinal frame members and an arcuate member connected to said members, a drawbar control attachment comprising an hydraulic piston and cylinder unit mounted on the tractor and control means for said unit, a substantially triangular body member pivotally connected near one corner to the cross bar, a link connecting the piston with a second corner of the said body member, and a link pivotally connecting the third corner with the drawbar aforesaid, said drawbar being supported intermediate the pivoted end and the connection of the link therewith, by and beneath the arcuate member for movement therealong, said triangular body member including front and rear portions, the front portion including the first and second corners, the rear portion being offset downwardly from and parallel to said front portion, the said third corner being included in the rear portion aforesaid.

TITUS MILLER.

REFERENCES CITED

The following references are of record in the file of this patent:

UNITED STATES PATENTS

| Number | Name | Date |
|---|---|---|
| 1,341,918 | Logan | June 1, 1920 |
| 1,842,129 | Thomas | Jan. 19, 1932 |
| 1,962,423 | Brown | June 12, 1934 |
| 2,232,407 | Riesterer | Feb. 18, 1941 |